US012657102B1

(12) United States Patent
O'Dwyer et al.

(10) Patent No.: US 12,657,102 B1
(45) Date of Patent: Jun. 16, 2026

(54) COMPUTING NETWORK FOR MODIFYING A COMPUTING RECORD BASED ON GENERATING AND UPDATING A COMPUTING REPORT

(71) Applicant: Veeva Systems Inc., Pleasanton, CA (US)

(72) Inventors: Shannon O'Dwyer, Brooklyn, NY (US); Marius K. Mortensen, Burlington (CA); Yui To Wong, Toronto (CA); Thomas Anthony Pimental, III, West Bridgewater, MA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/097,322

(22) Filed: Apr. 1, 2025

(51) Int. Cl.
G06F 11/30 (2006.01)
G06F 8/65 (2018.01)

(52) U.S. Cl.
CPC ............ *G06F 11/3075* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 12,242,994 B1 * | 3/2025 | Aggarwal .......... | G06Q 10/0633 |
| 2007/0067185 A1 * | 3/2007 | Halsted ................. | G16H 40/63 |
| | | | 705/2 |
| 2019/0042554 A1 * | 2/2019 | Aylett ................. | G06F 40/186 |
| 2019/0361876 A1 * | 11/2019 | Rogynskyy .......... | G06Q 10/107 |

* cited by examiner

*Primary Examiner* — Devin C Hein
*Assistant Examiner* — Vincent C Ilagan
(74) *Attorney, Agent, or Firm* — Finnegan, Henderson, Farabow, Garrett & Dunner, LLP

(57) ABSTRACT

This disclosure is directed to modifying a computing record based on generating and updating a computing report associated with an event. The disclosed method includes: receiving a first source file associated with an event; generating a first computing record based on the first source file; determining, based on the first computing record, a severity indicator, a location, and a computing group; generating a first configuration; executing, based on the first computing record, the first configuration, thereby generating a computing report; modifying, based on the computing report, the first computing record; receiving a second source file associated with the event; generating a second computing record based on the second source file; comparing the first computing record and the second computing record; executing the first configuration or a second configuration, thereby generating an updated computing report; and modifying, based on the updated computing record and the comparing, the first computing record.

22 Claims, 12 Drawing Sheets

Figure 5A:
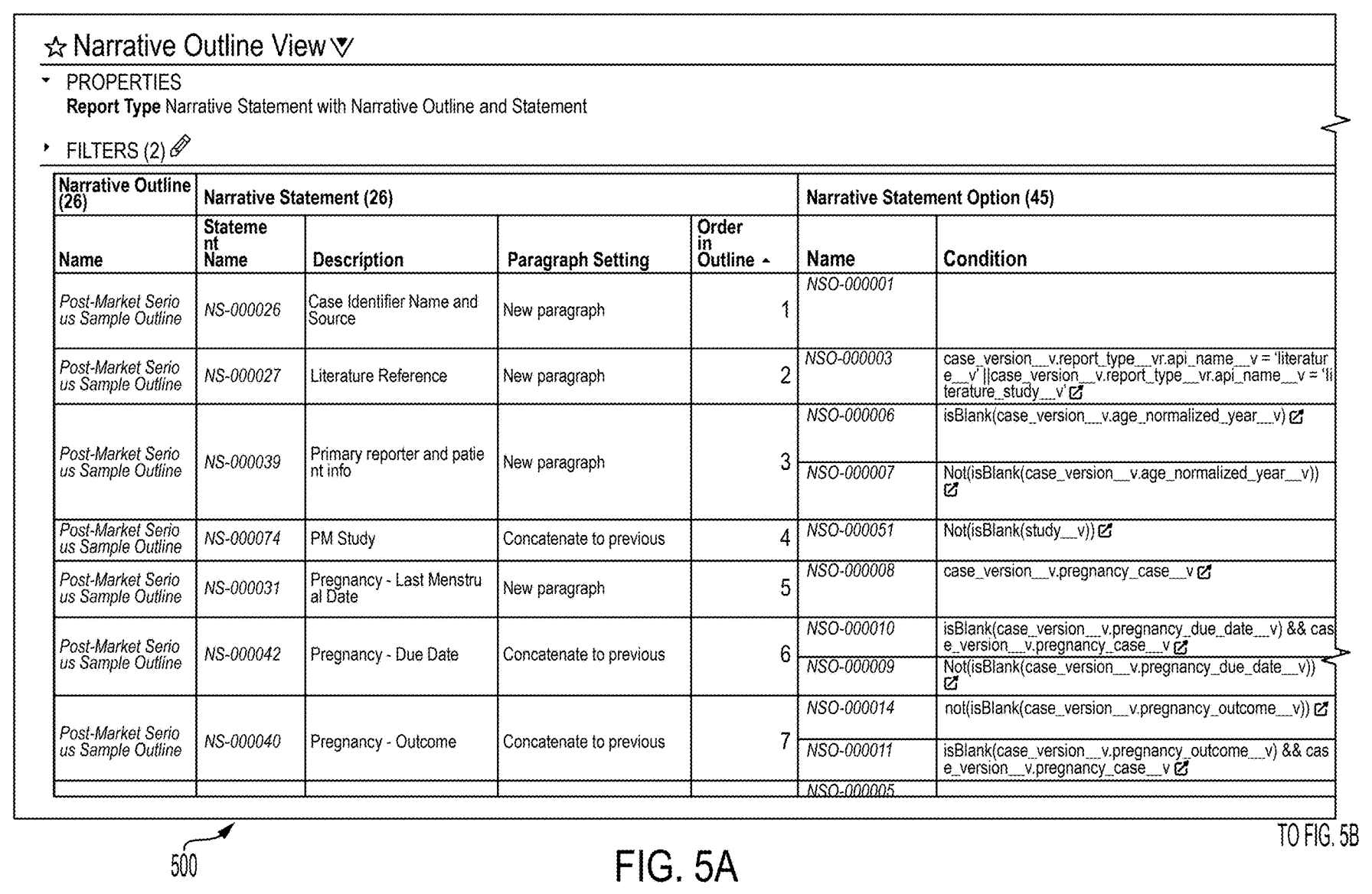

☆ Narrative Outline View ▽

▸ PROPERTIES
Report Type Narrative Statement with Narrative Outline and Statement

▸ FILTERS (2) ✎

| Narrative Outline (26) Name | Narrative Statement (26) Statement Name | Description | Paragraph Setting | Order in Outline ▴ | Narrative Statement Option (45) Name | Condition |
|---|---|---|---|---|---|---|
| Post-Market Serious Sample Outline | NS-000026 | Case Identifier Name and Source | New paragraph | 1 | NSO-000001 | |
| Post-Market Serious Sample Outline | NS-000027 | Literature Reference | New paragraph | 2 | NSO-000003 | case_version__.v.report_type__.vr.api_name__v = 'literatur e__v'||case_version__.v.report_type__vr.api_name__v = 'li terature_study__v' ✎ |
| Post-Market Serious Sample Outline | NS-000039 | Primary reporter and patie nt info | New paragraph | 3 | NSO-000006 | isBlank(case_version__.v.age_normalized_year__v) ✎ |
| Post-Market Serious Sample Outline | NS-000074 | PM Study | Concatenate to previous | | NSO-000007 | Not(isBlank(case_version__.v.age_normalized_year__v)) ✎ |
| Post-Market Serious Sample Outline | NS-000031 | Pregnancy - Last Menstru al Date | New paragraph | 4 | NSO-000051 | Not(isBlank(study__v)) ✎ |
| Post-Market Serious Sample Outline | NS-000042 | Pregnancy - Due Date | Concatenate to previous | 5 | NSO-000008 | case_version__.v.pregnancy_case__v ✎ |
| Post-Market Serious Sample Outline | NS-000040 | Pregnancy - Outcome | Concatenate to previous | 6 | NSO-000010 | isBlank(case_version__.v.pregnancy_due_date__v) && cas e_version__.v.pregnancy_case__v ✎ |
| | | | | | NSO-000009 | Not(isBlank(case_version__.v.pregnancy_due_date__v)) ✎ |
| | | | | 7 | NSO-000014 | not(isBlank(case_version__.v.pregnancy_outcome__v)) ✎ |
| | | | | | NSO-000011 | isBlank(case_version__.v.pregnancy_outcome__v) && cas e_version__.v.pregnancy_case__v ✎ |
| | | | | | NSO-000005 | |

Figure 5B:
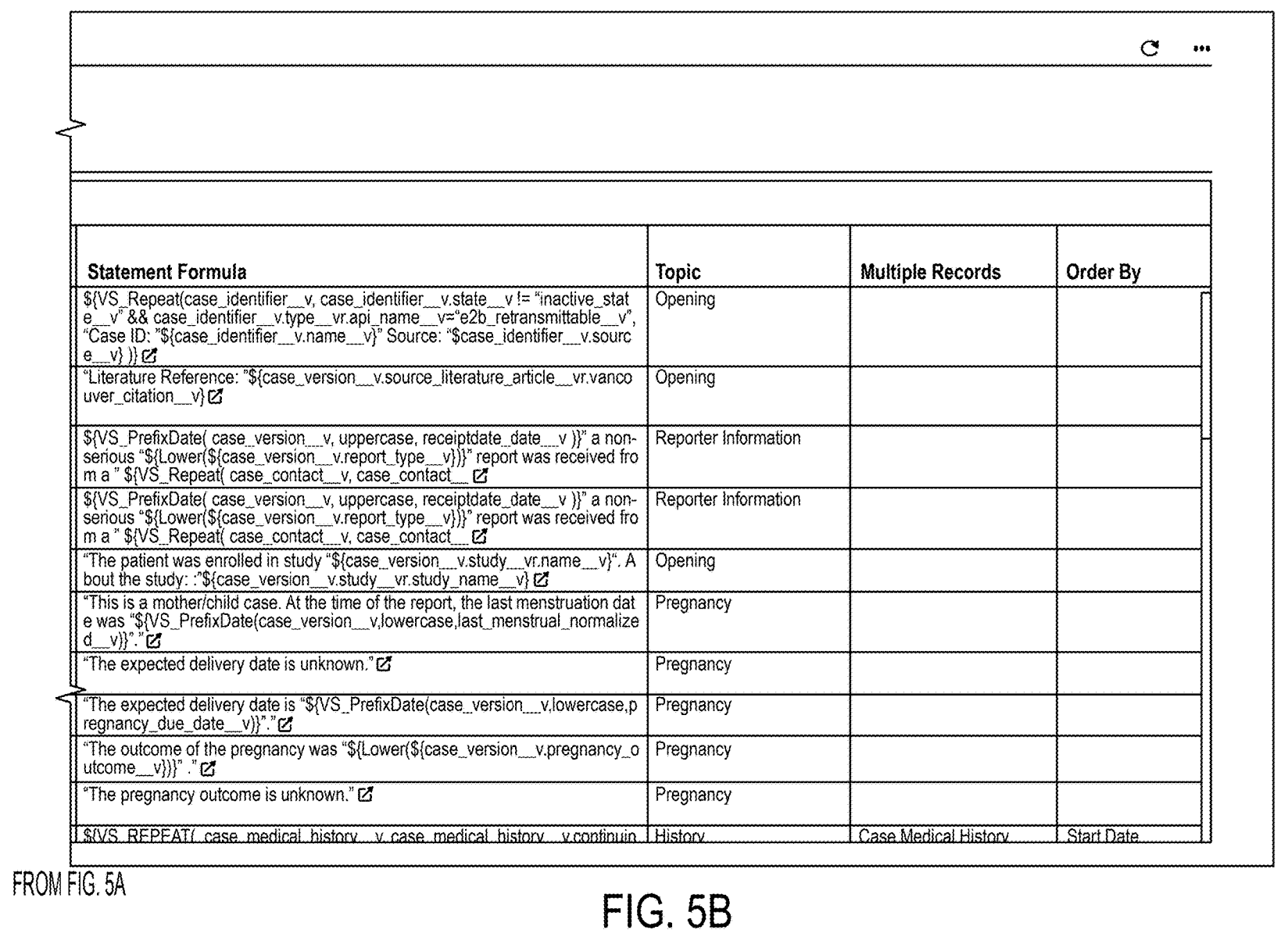

| Statement Formula | Topic | Multiple Records | Order By |
|---|---|---|---|
| ${VS_Repeat(case_identifier__v, case_identifier__v.state__v != "inactive_stat e__v"&& case_identifier__v.type__vr.api_name__v="e2b_retransmittable__v", "Case ID: "${case_identifier__v.name__v}" Source: $case_identifier__v.sourc e__v})}☑ | Opening | | |
| "Literature Reference: "${case_version__v.source_literature_article__vr.vanco uver_citation__v}☑ | Opening | | |
| ${VS_PrefixDate( case_version__v, uppercase, receiptdate_date__v )}", a non-serious "${Lower($case_version__v.report_type__v)}" report was received fro m a " ${VS_Repeat( case_contact__v, case_contact__v }☑ | Reporter Information | | |
| ${VS_PrefixDate( case_version__v, uppercase, receiptdate_date__v )}", a non-serious "${Lower($case_version__v.report_type__v)}" report was received fro m a " ${VS_Repeat( case_contact__v, case_contact__v }☑ | Reporter Information | | |
| "The patient was enrolled in study "${case_version__v.study__v.study__vr.name__v}". A bout the study: "${case_version__v.study__vr.study_name__v}☑ | Opening | | |
| "This is a mother/child case. At the time of the report, the last menstruation dat e was "${VS_PrefixDate(case_version__v.lowercase,last_menstrual_normalize d__v}}".☑ | Pregnancy | | |
| "The expected delivery date is unknown."☑ | Pregnancy | | |
| "The expected delivery date is "${VS_PrefixDate(case_version__v.lowercase,p regnancy_due_date__v}}".☑ | Pregnancy | | |
| "The outcome of the pregnancy was "${Lower(${case_version__v.pregnancy_o utcome__v}}" .☑ | Pregnancy | | |
| "The pregnancy outcome is unknown."☑ | Pregnancy | | |
| ${VS_REPEAT( case_medical_history__v.case_medical_history__v.continuin_history__v.continuin... | History | Case Medical History | Start Date |

FROM FIG. 5A

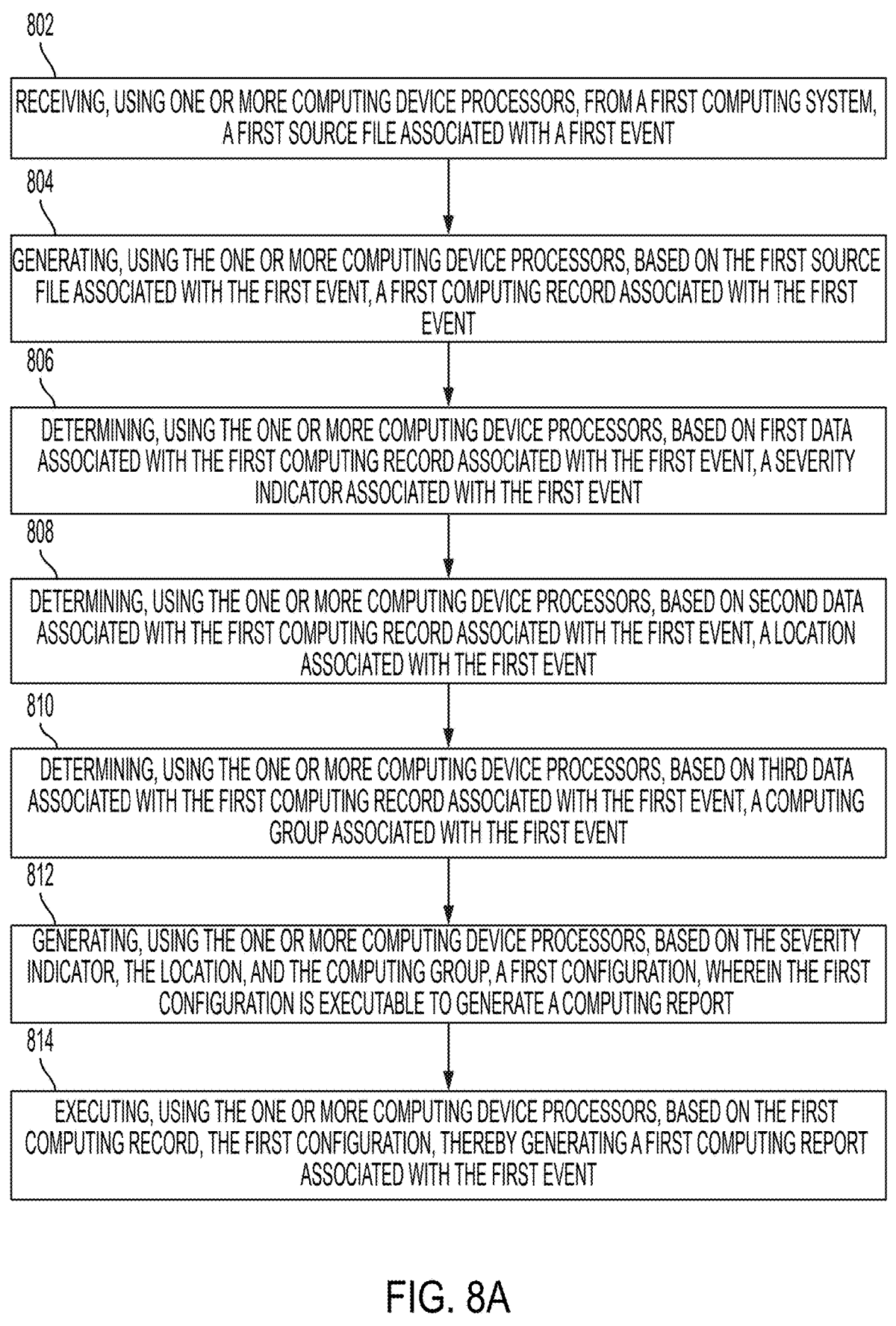

RECEIVING, USING ONE OR MORE COMPUTING DEVICE PROCESSORS, FROM A FIRST COMPUTING SYSTEM, A FIRST SOURCE FILE ASSOCIATED WITH A FIRST EVENT

804

GENERATING, USING THE ONE OR MORE COMPUTING DEVICE PROCESSORS, BASED ON THE FIRST SOURCE FILE ASSOCIATED WITH THE FIRST EVENT, A FIRST COMPUTING RECORD ASSOCIATED WITH THE FIRST EVENT

806

DETERMINING, USING THE ONE OR MORE COMPUTING DEVICE PROCESSORS, BASED ON FIRST DATA ASSOCIATED WITH THE FIRST COMPUTING RECORD ASSOCIATED WITH THE FIRST EVENT, A SEVERITY INDICATOR ASSOCIATED WITH THE FIRST EVENT

808

DETERMINING, USING THE ONE OR MORE COMPUTING DEVICE PROCESSORS, BASED ON SECOND DATA ASSOCIATED WITH THE FIRST COMPUTING RECORD ASSOCIATED WITH THE FIRST EVENT, A LOCATION ASSOCIATED WITH THE FIRST EVENT

810

DETERMINING, USING THE ONE OR MORE COMPUTING DEVICE PROCESSORS, BASED ON THIRD DATA ASSOCIATED WITH THE FIRST COMPUTING RECORD ASSOCIATED WITH THE FIRST EVENT, A COMPUTING GROUP ASSOCIATED WITH THE FIRST EVENT

812

GENERATING, USING THE ONE OR MORE COMPUTING DEVICE PROCESSORS, BASED ON THE SEVERITY INDICATOR, THE LOCATION, AND THE COMPUTING GROUP, A FIRST CONFIGURATION, WHEREIN THE FIRST CONFIGURATION IS EXECUTABLE TO GENERATE A COMPUTING REPORT

814

EXECUTING, USING THE ONE OR MORE COMPUTING DEVICE PROCESSORS, BASED ON THE FIRST COMPUTING RECORD, THE FIRST CONFIGURATION, THEREBY GENERATING A FIRST COMPUTING REPORT ASSOCIATED WITH THE FIRST EVENT

FIG. 8A

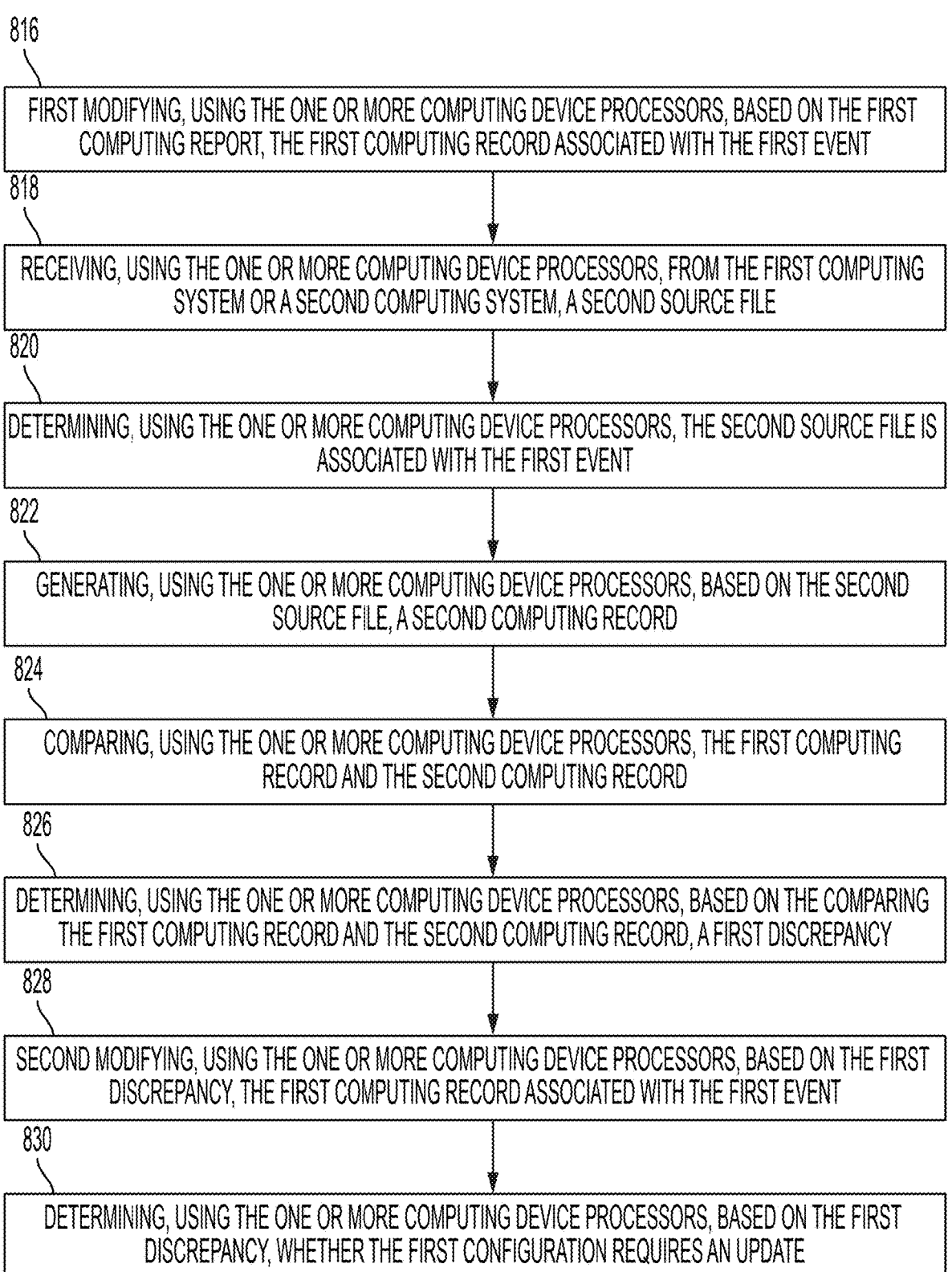

816

FIRST MODIFYING, USING THE ONE OR MORE COMPUTING DEVICE PROCESSORS, BASED ON THE FIRST COMPUTING REPORT, THE FIRST COMPUTING RECORD ASSOCIATED WITH THE FIRST EVENT

818

RECEIVING, USING THE ONE OR MORE COMPUTING DEVICE PROCESSORS, FROM THE FIRST COMPUTING SYSTEM OR A SECOND COMPUTING SYSTEM, A SECOND SOURCE FILE

820

DETERMINING, USING THE ONE OR MORE COMPUTING DEVICE PROCESSORS, THE SECOND SOURCE FILE IS ASSOCIATED WITH THE FIRST EVENT

822

GENERATING, USING THE ONE OR MORE COMPUTING DEVICE PROCESSORS, BASED ON THE SECOND SOURCE FILE, A SECOND COMPUTING RECORD

824

COMPARING, USING THE ONE OR MORE COMPUTING DEVICE PROCESSORS, THE FIRST COMPUTING RECORD AND THE SECOND COMPUTING RECORD

826

DETERMINING, USING THE ONE OR MORE COMPUTING DEVICE PROCESSORS, BASED ON THE COMPARING THE FIRST COMPUTING RECORD AND THE SECOND COMPUTING RECORD, A FIRST DISCREPANCY

828

SECOND MODIFYING, USING THE ONE OR MORE COMPUTING DEVICE PROCESSORS, BASED ON THE FIRST DISCREPANCY, THE FIRST COMPUTING RECORD ASSOCIATED WITH THE FIRST EVENT

830

DETERMINING, USING THE ONE OR MORE COMPUTING DEVICE PROCESSORS, BASED ON THE FIRST DISCREPANCY, WHETHER THE FIRST CONFIGURATION REQUIRES AN UPDATE

FIG. 8B

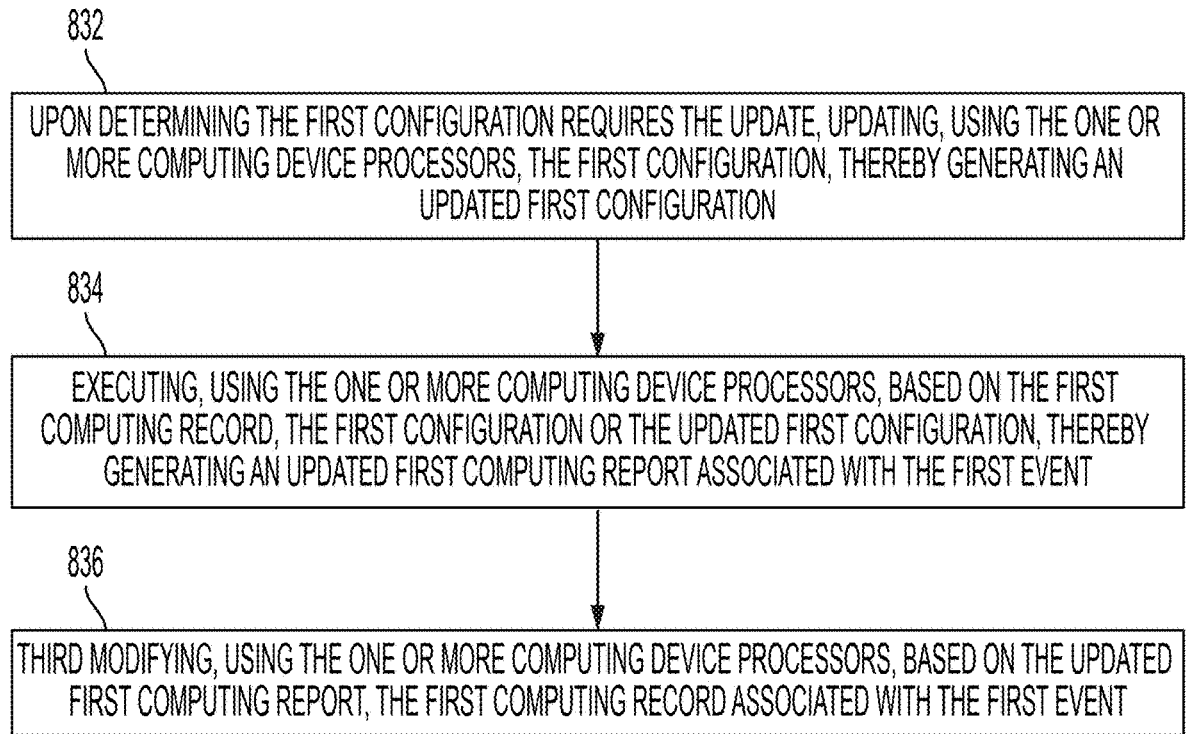

832

UPON DETERMINING THE FIRST CONFIGURATION REQUIRES THE UPDATE, UPDATING, USING THE ONE OR MORE COMPUTING DEVICE PROCESSORS, THE FIRST CONFIGURATION, THEREBY GENERATING AN UPDATED FIRST CONFIGURATION

834

EXECUTING, USING THE ONE OR MORE COMPUTING DEVICE PROCESSORS, BASED ON THE FIRST COMPUTING RECORD, THE FIRST CONFIGURATION OR THE UPDATED FIRST CONFIGURATION, THEREBY GENERATING AN UPDATED FIRST COMPUTING REPORT ASSOCIATED WITH THE FIRST EVENT

836

THIRD MODIFYING, USING THE ONE OR MORE COMPUTING DEVICE PROCESSORS, BASED ON THE UPDATED FIRST COMPUTING REPORT, THE FIRST COMPUTING RECORD ASSOCIATED WITH THE FIRST EVENT

COMPUTING NETWORK FOR MODIFYING A COMPUTING RECORD BASED ON GENERATING AND UPDATING A COMPUTING REPORT

TECHNICAL FIELD

This disclosure is directed to modifying a computing record based on generating and updating a computing report associated with an event.

BACKGROUND

There is a need to efficiently and accurately generate a computing report using information comprised in a computing record.

SUMMARY

This disclosure is directed to methods, systems, and computer program products for modifying a computing record based on generating and updating a computing report associated with an event. According to an embodiment, a method for modifying a computing record based on generating and updating a computing report associated with an event comprises: receiving, using one or more computing device processors, from a first computing system, a first source file associated with a first event; generating, using the one or more computing device processors, based on the first source file associated with the first event, a first computing record associated with the first event; determining, using the one or more computing device processors, based on first data associated with the first computing record associated with the first event, a severity indicator associated with the first event; determining, using the one or more computing device processors, based on second data associated with the first computing record associated with the first event, a location associated with the first event; determining, using the one or more computing device processors, based on third data associated with the first computing record associated with the first event, a computing group associated with the first event; generating, using the one or more computing device processors, based on the severity indicator, the location, and the computing group, a first configuration, wherein the first configuration is executable to generate a computing report; executing, using the one or more computing device processors, based on the first computing record, the first configuration, thereby generating a first computing report associated with the first event; first modifying, using the one or more computing device processors, based on the first computing report, the first computing record associated with the first event; receiving, using the one or more computing device processors, from the first computing system or a second computing system, a second source file; determining, using the one or more computing device processors, the second source file is associated with the first event; generating, using the one or more computing device processors, based on the second source file, a second computing record; comparing, using the one or more computing device processors, the first computing record and the second computing record; determining, using the one or more computing device processors, based on the comparing the first computing record and the second computing record, a first discrepancy; second modifying, using the one or more computing device processors, based on the first discrepancy, the first computing record associated with the first event; determining, using the one or more computing device processors, based on the first discrepancy, whether the first configuration requires an update; upon determining the first configuration requires the update, updating, using the one or more computing device processors, the first configuration, thereby generating an updated first configuration; executing, using the one or more computing device processors, based on the first computing record, the first configuration or the updated first configuration, thereby generating an updated first computing report associated with the first event; and third modifying, using the one or more computing device processors, based on the updated first computing report, the first computing record associated with the first event.

In some embodiments, the generating the first computing report associated with the first event comprises applying at least one rule to fourth data comprised in the first computing record.

Furthermore, according to some embodiments, the applying the at least one rule to the fourth data comprised in the first computing record comprises: extracting first information comprised in the fourth data; formatting the first information comprised in the fourth data, thereby generating formatted first information; and adding the formatted first information to the first computing report.

In one embodiment, the determining whether the first configuration requires the update is based on the first discrepancy being associated with at least one of: the severity indicator, the location, or the computing group.

According to another embodiment, the generating the first configuration is based on at least one of: the severity indicator, the location, or the computing group.

In some cases, the location associated with the first event comprises or is associated with at least one of: a country, a city, a state, or a region.

According to one embodiment, the severity indicator associated with the first event comprises or is based on a severity ranking associated with the first event.

In another embodiment, the computing group associated with the first event comprises or is associated with at least one of: an organization, a customer, or a company.

According to some embodiments, the first computing report comprises a narrative or a summary associated with the first event.

In some embodiments, the one or more computing device processors are comprised in one or more computing systems, wherein the one or more computing systems are located in one or more locations.

According to another embodiment, a system for modifying a computing record based on generating and updating a computing report associated with an event comprises: one or more hardware computing system processors; and at least one memory storing instructions, that when executed by the one or more hardware computing system processors causes the one or more hardware computing system processors to: receive, from a first computing system, a first source file associated with a first event; generate, based on the first source file associated with the first event, a first computing record associated with the first event; determine, based on first data associated with the first computing record associated with the first event, a severity indicator associated with the first event; determine, based on second data associated with the first computing record associated with the first event, a location associated with the first event; determine, based on third data associated with the first computing record associated with the first event, a computing group associated with the first event; generate, based on the severity indicator, the location, and the computing group, a first configuration, wherein the first configuration is executable to generate a computing report; execute the first configuration on the first computing record, thereby generating a first computing report associated with the first event; first modify, based on the first computing report, the first computing record associated with the first event; receive, from the first computing system or a second computing system, a second source file; determine the second source file is associated with the first event; generate, based on the second source file, a second computing record; compare the first computing record and the second computing record; determine, based on the compare the first computing record and the second computing record, a first discrepancy; second modify, based on the first discrepancy, the first computing record associated with the first event; determine, based on the first discrepancy, whether the first configuration requires an update; upon determining the first configuration requires the update, update the first configuration, thereby generating an updated first configuration; execute the first configuration or the updated first configuration on the first computing record, thereby generating an updated first computing report associated with the first event; and third modify, based on the updated first computing report, the first computing record associated with the first event.

In some embodiments, the first discrepancy comprises updated information associated with the first event or new information associated with the first event.

Furthermore, according to one embodiment, the second modifying, based on the first discrepancy, the first computing record comprises: updating the first computing record based on the updated information associated with the first event, or adding the new information associated with the first event.

In some cases, the determining the second source file is associated with the first event comprises or is based on the comparing the first computing record and the second computing record.

According to some embodiments, the updated first computing report comprises the first computing report.

According to yet another embodiment, a method for modifying a computing record based on generating and updating a computing report associated with an event comprises: receiving, using one or more computing device processors, from a first computing system, a first source file associated with a first event; generating, using the one or more computing device processors, based on the first source file associated with the first event, a first computing record associated with the first event; determining, using the one or more computing device processors, based on first data associated with the first computing record associated with the first event, a severity indicator associated with the first event; determining, using the one or more computing device processors, based on second data associated with the first computing record associated with the first event, a location associated with the first event; determining, using the one or more computing device processors, based on third data associated with the first computing record associated with the first event, a computing group associated with the first event; generating, using the one or more computing device processors, based on at least one of: the severity indicator, the location, and the computing group, a first configuration, wherein the first configuration is executable to generate a computing report; executing, using the one or more computing device processors, based on the first computing record, the first configuration, thereby generating a first computing report associated with the first event; first modifying, using the one or more computing device processors, based on the first computing report, the first computing record associated with the first event; receiving, using the one or more computing device processors, from the first computing system or a second computing system, a second source file; determining, using the one or more computing device processors, the second source file is associated with the first event; generating, using the one or more computing device processors, based on the second source file, a second computing record; comparing, using the one or more computing device processors, the first computing record and the second computing record; determining, using the one or more computing device processors, based on the comparing the first computing record and the second computing record, a first discrepancy; second modifying, using the one or more computing device processors, based on the first discrepancy, the first computing record associated with the first event; executing, using the one or more computing device processors, based on the first computing record, the first configuration or a second configuration, thereby generating an updated first computing report associated with the first event; and third modifying, using the one or more computing device processors, based on the updated first computing report, the first computing record associated with the first event.

In some embodiments, the first modifying, based on the first computing report, the first computing record, comprises adding or linking the first computing report to the first computing record.

In other embodiments, the third modifying, based on the updated first computing report, the first computing record comprises adding or linking the updated first computing report to the first computing record.

According to one embodiment, the updated first computing report comprises a narrative or a summary associated with the first event.

In some cases, the first configuration defines a structure associated with the first computing report.

In one embodiment, the applying the at least one rule to the fourth data comprised in the first computing record comprises providing or applying a structure to the first computing record.

According to another embodiment, a system or a computer program product can include or execute the methods described above. These and other implementations may each optionally include one or more of the above features.

BRIEF DESCRIPTION OF THE DRAWINGS

The disclosure is illustrated by way of example, and not by way of limitation in the figures of the accompanying drawings in which like reference numerals are used to refer to similar elements. It is appreciated that various features may not be drawn to scale and the dimensions of various features may be arbitrarily increased or reduced for clarity of discussion. Further, some components may be omitted in certain figures for clarity of discussion.

FIGS. 3, 4, 5A, 5B, 6, and 7 show example interfaces used to modify a computing record based on generating and updating a computing report associated with an event.

FIGS. 8A, 8B, and 8C show an exemplary workflow for modifying a computing record based on generating and updating a computing report associated with an event.

Although similar reference numbers for the foregoing drawings may be used to refer to similar elements for convenience, it is appreciated that each of the various exemplary embodiments may be considered to be distinct variations. As used in this disclosure, the terms "embodiment," "example embodiment," "exemplary embodiment," "implementation," and the like do not necessarily refer to a single embodiment, although it may, and various example embodiments may be readily combined and interchanged, without departing from the scope or spirit of the present disclosure. Furthermore, the terminology used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Reference will now be made to various embodiments, examples of which are illustrated in the accompanying drawings and figures. In the following detailed description, numerous specific details are set forth in order to provide a thorough understanding of this disclosure. However, it will be apparent to one of ordinary skill in the art that the disclosure may be practiced without these specific details. In some instances, well-known methods, processes, components, systems, and networks have not been described in detail so as not to unnecessarily obscure aspects of the disclosed embodiments.

Network Environment

Figure 1A:
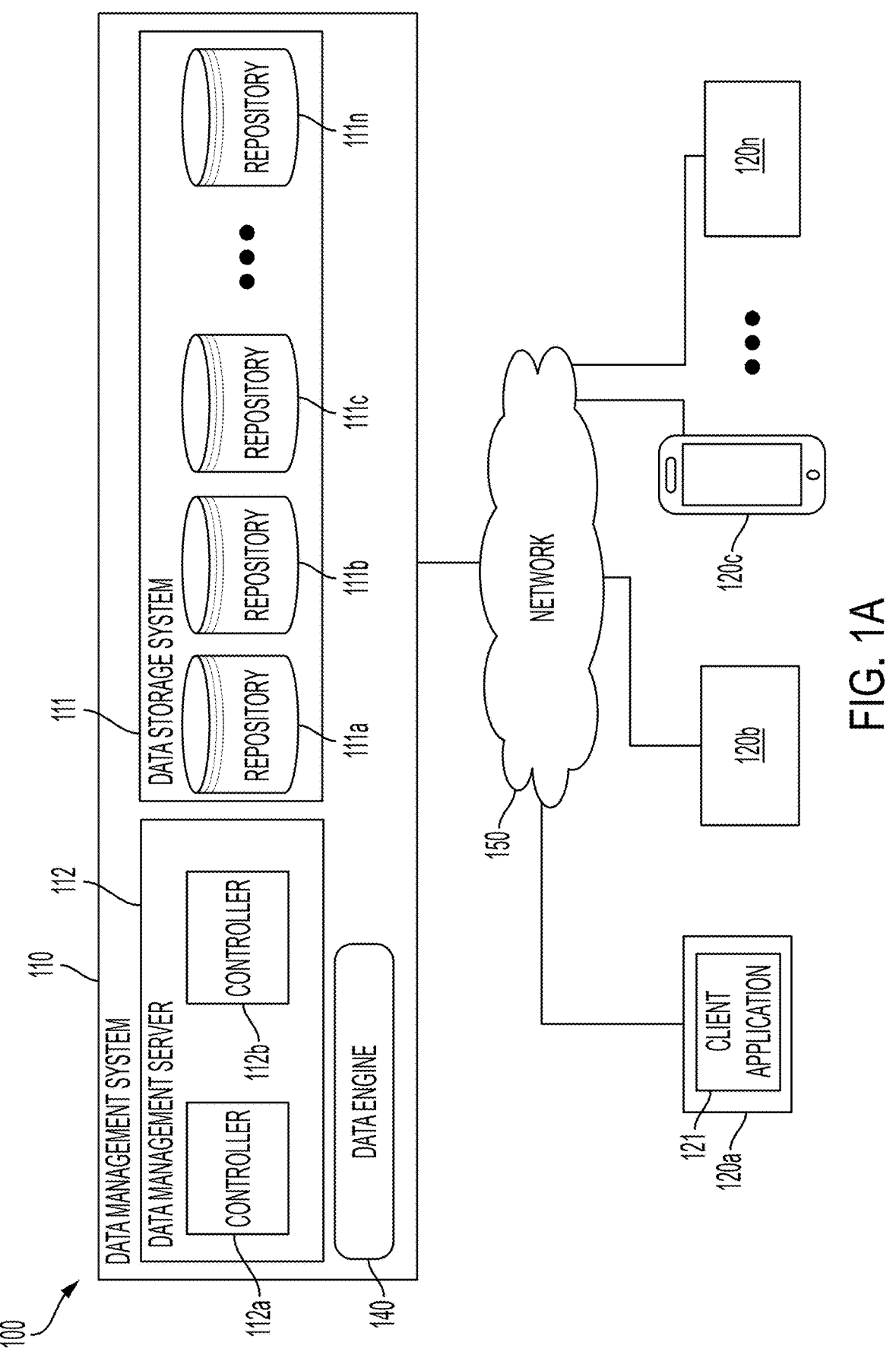
FIG. 1A illustrates an exemplary secure storage network within which the present technology may be implemented, according to some embodiments of this disclosure.

FIG. 1A illustrates an exemplary secure storage network 100 within which the present technology may be implemented. As shown, the secure storage network 100 may include a data management system 110 (also referred to as a secure storage system 110 elsewhere herein), and a plurality of user computing devices 120a, 120b, . . . 120n coupled to each other via a network 150.

The data management system 110 may include a data storage system 111 and a data management server 112. The data storage system 111 may have one or more secure repositories 111a, 111b, 111c, . . . 111n. Each of the one or more secure repositories 111a, 111b, 111c, . . . 111n may comprise two or more secure storage structures configured to store, at least index data, and/or file data, and/or record data, and/or report data, and/or event data, and/or user data as the case may require. According to one embodiment, the index data, and/or file data, and/or record data, and/or report data, and/or event data, and/or user data may be associated with a medical facility, a research facility, a governmental agency, an educational institution, etc. In some cases, the data storage system 111 comprises secure data structures, and/or computing storage structures that securely store data indices, files associated with said data indices, and/or records associated with said data indices, and/or computing records, and/or computing reports.

The network 150 may include one or more types of communication networks such as a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a, . . . 120n may be any machine or system that is used by a user to access the data management system 110 via the network 150, and may comprise computing devices including laptop computers, desktop computers, mobile phones, smart phones, tablet computers, and netbooks. A client application 121 (e.g., a secure interface) associated with the data management system 110 may be run from a user computing device (e.g., 120a) to securely access data in the data management system 110 via the network 150.

The data storage system 111 may store data that client applications (e.g., client application 121) in user computing devices 120a . . . 120n may access. Furthermore, the data storage system 111 may comprise any commercially available storage devices.

According to one embodiment, each content repository (e.g., 111a, 111b, 111c, . . . or 111n) may store one or more data categories such that one or more users may be provided access to the one or more data categories based on context data associated with the one or more users and/or context data associated with the one or more data categories.

It is appreciated that the disclosed content repositories 111a, 111b, 111c, . . . 111n may comprise separate logic sections in the same storage device. According to one embodiment, content data stored in the content repositories 111a, 111b, 111c, . . . 111n may comprise controlled content stored in specialized databases including at least one source of truth database within said repositories such that specific users and/or specific computing devices may be provided credential access to said repositories based on one or more profiles of the specific users and/or specific devices previously stored or otherwise associated with the data management system 110.

According to one embodiment, each of the content repositories 111a, 111b, 111c, . . . 111n can be implemented as one or more computer-readable or machine-readable storage media that are non-transitory. In some embodiments, the content repositories 111a, 111b, 111c, . . . 111n may be distributed within and/or across multiple internal and/or external enclosures of a computing system and/or additional computing systems. Furthermore, each of the content repositories 111a, 111b, 111c, . . . 111n may comprise one or more similar or dissimilar forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks; optical media such as compact disks (CDs) or digital video disks (DVDs), BluRays or other types of optical media; or other types of storage devices.

The data management server 112 may comprise a remote computer system accessible over a remote or local network, such as the network 150. The data management server 112 may store a data management controller 112a and a data collection controller 112b for controlling management and collection of the data. The data management server 112 could be any commercially available computing devices. Although only one server is shown, it is appreciated that the data management system 110 may have a plurality of servers such that the controllers 112a and 112b may be in separate servers. A client application (e.g., client application 121) may be active on one or more user computing devices 120a, . . . , 120n. The corresponding server application may be active on the data management server 112. The client application and the corresponding server application may communicate with each other over the network 150 and thereby provide distributed functionality and allow multiple client applications to take advantage of the information-gathering capabilities of the data management system 110.

Figure 2:
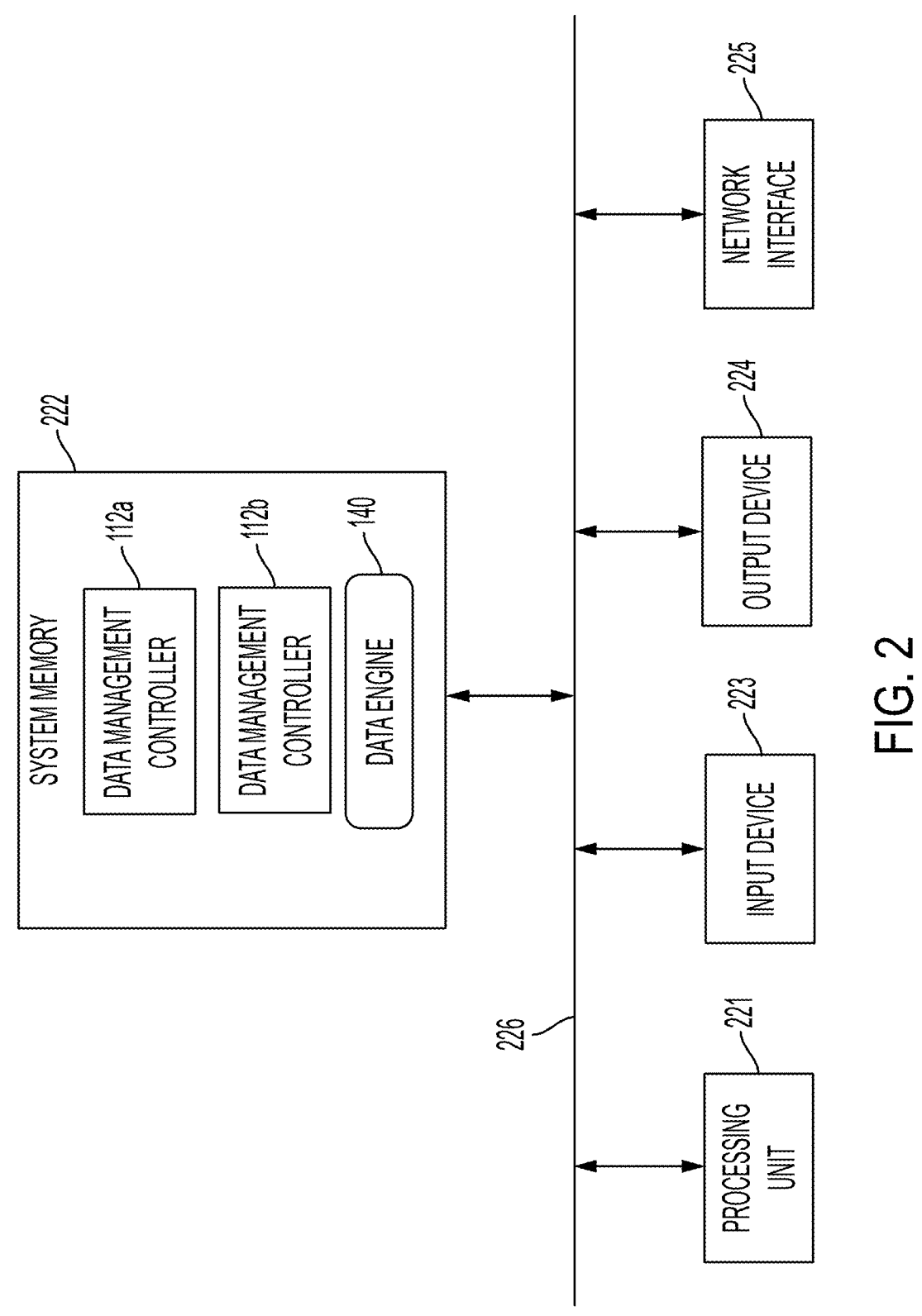
FIG. 2 illustrates an example high level block diagram of the data management system of FIG. 1A, according to some embodiments of this disclosure.

The data engine 140 shown within the data management system 110 may include instructions stored in a system memory (e.g., memory 222 of FIG. 2) that are executed by one or more computing device processors (e.g., processing unit 221 of FIG. 2). The instructions may include various operations or processes discussed below in association with, for example, one or more task protocols, and/or one or more data routing computing operations, and/or one or more data correlation or data relation computing operations.

In one embodiment, the secure storage network 100 may be used for collecting and managing data (e.g., user data, computing record data, computing report data, event data, index data, file data, record data, file or record data associated with a trial, file or record data associated with a research, medical file or record data, etc.). For example, a first repository (e.g., repository 111a) of the secure storage network 100 may store electronic records or electronic files or index data or user data or computing record data or computing report data or event data as the case may require. In some cases, the electronic records comprise electronic data capture (EDC) data and/or trial source data (e.g., associated with a subject), and/or medical inquiry data, and/or quality control data, and/or safety data, etc. It is appreciated that a trial as described in this disclosure may refer to a clinical trial.

The data management system 110 may have: one or more interfaces for receiving the plurality of data described herein; database or query mechanisms for operating on the plurality of data; and one or more reporting tools for analysis of the plurality of data.

Furthermore, each of the content repositories 111a, 111b, 111c, . . . or 111n may be used by a plurality of sites (e.g., a hospital site, a school site, a research site, a pharmaceutical company site, etc.) to store the plurality of data provided in this disclosure. In one embodiment, the plurality of data comprises source data (e.g., vital statistics data such as blood pressure values, research results values, chemical analysis values, biographic data, bibliographic data, demographic data, test data, etc.) which may be converted to EDC data automatically, and then stored in one or more of the content repositories 111a, 111b, 111c, . . . or 111n. It is appreciated that the EDC data stored in the various content repositories 111a, 111b, 111c, . . . or 111n may be synchronized to ensure that data inconsistencies do not creep into any of the content repositories 111a, 111b, 111c, . . . or 111n. It is further appreciated that each of the content repositories 111a, 111b, 111c, . . . or 111n may have two or more data storage structures.

In one embodiment, the data management system 110 may comprise a multi-tenant system where various elements of hardware and software are shared by one or more users. For instance, the data management server 110 may simultaneously and securely process requests from a plurality of users, and the data storage system 111 may securely store controlled or secure content for the plurality of users.

In one embodiment, the data management system 110 may run on a cloud computing platform. Users of said cloud computing platform can access the controlled content comprised in the cloud computing platform independently by using, for example, a virtual machine image, or acquiring access to a service maintained by a cloud database provider associated with the secure storage network 100. In one embodiment, the data management system 110 may be provided as Software as a Service ("SaaS") to allow users to access the data management system 110 with, for example, a thin client.

Figure 1B:
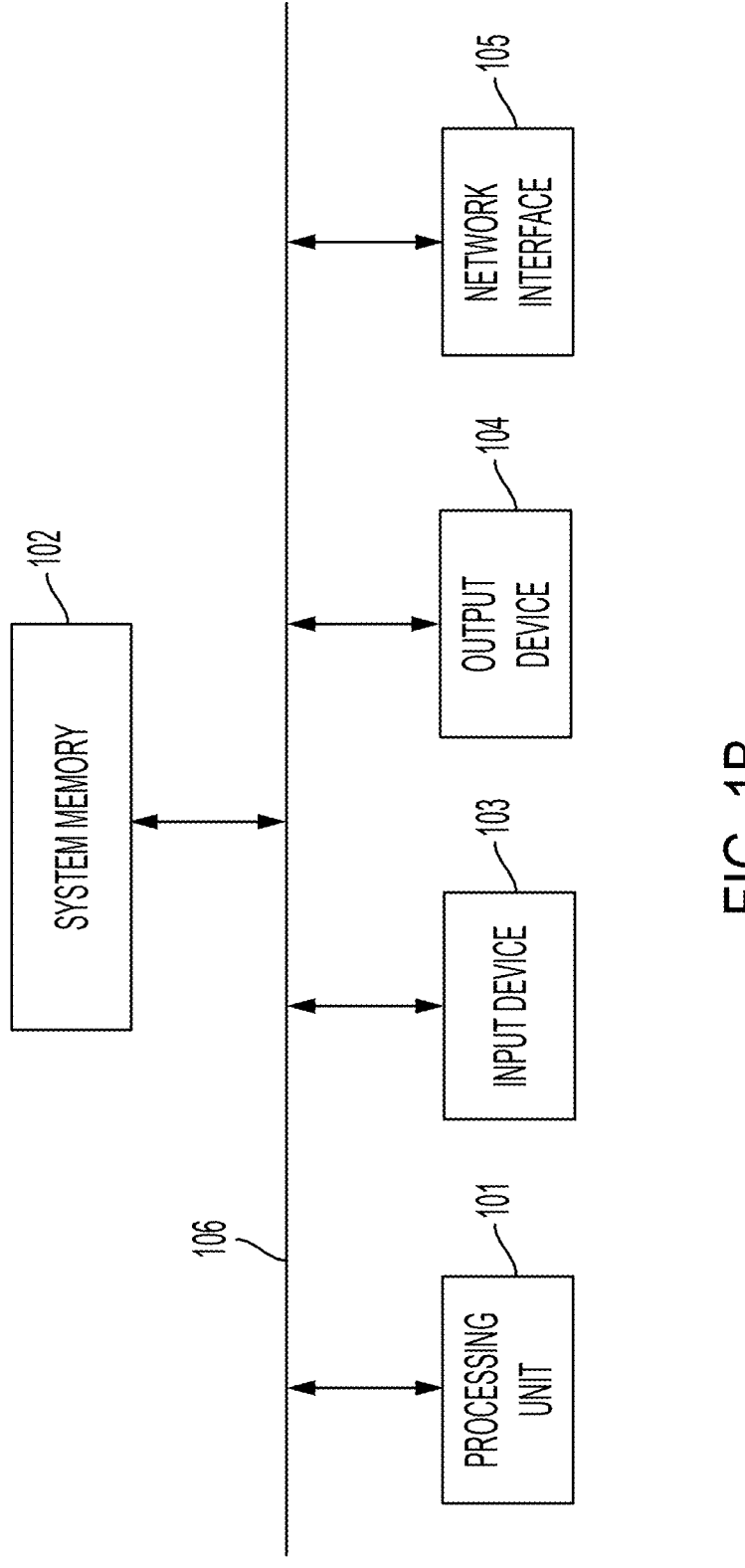
FIG. 1B illustrates an example block diagram of a computing device within which one or more systems or devices of FIG. 1A can be implemented, according to some embodiments of this disclosure.

FIG. 1B illustrates an example block diagram of a computing device which can be used as the computing devices 120a, . . . , 120n, and the data management system 110 of FIG. 1A. The illustrated computing device is only one example of a suitable computing environment and is not intended to suggest any limitation as to scope of use or functionality. The computing device of FIG. 1B may include a processing unit 101, a system memory 102, an input device 103, an output device 104, a network interface 105, and a system bus 106 that couples these components to each other.

The processing unit 101 may be configured to execute computer instructions or computing operations that are stored in a computer-readable medium, for example, the system memory 102. The processing unit 101 may comprise a central processing unit (CPU).

The system memory 102 can include a variety of computer readable media which may be any available media accessible by the processing unit 101. For instance, the system memory 102 may include computer storage media in the form of volatile and/or non-volatile memory such as read only memory (ROM) and/or random-access memory (RAM). By way of example, but not limitation, the system memory 102 may store instructions and data including an operating system, program sub-systems, various application programs, and program data.

A user can enter computing commands and/or information to the computing device of FIG. 1B through the input device 103. The input device 103 may comprise a keyboard, a touchscreen input device, a touch pad, a mouse, a microphone, and/or an electronic pen and/or some other input computing device.

The computing device of FIG. 1B may provide output data via the output device 104 which may comprise a monitor, a display device (e.g., a display screen of a tablet, cell phone, etc.), a speaker, a printer, or some other output computing device.

The computing device of FIG. 1B, through the network interface 105, may operate in a networked or distributed environment using logical connections to one or more other computing devices, which may be a personal computer (PC), a server, a router, a network PC, a peer device, a smart phone, or any other media consumption or transmission computing device, and may include any or all of the elements described above. The logical connections may include a network (e.g., the network 150) and/or buses. The network interface 105 may be configured to allow the computing device of FIG. 1B to transmit and receive data in a network, for example, the network 150. The network interface 105 may include one or more network interface cards (NICs). It is appreciated that the computing device of FIG. 1B could comprise a stationary computing device or a mobile computing device.

FIG. 2 illustrates an example high level block diagram of the data management server 112 according to one embodiment of the present disclosure. The data management server 112 may be implemented by the computing device such as the computing device of FIG. 1B, and may have a processing unit 221, a system memory 222, an input device 223, an output device 224, and a network interface 225, coupled to each other via a system bus 226.

The system memory 222 may comprise data management controllers 112*a* and 112*b*. In one embodiment, the data management controllers 112*a* and 112*b* may be comprised in one or more applications including a web application or a Java application. In addition, the data management controllers 112*a* and 112*b* may be configured to receive and/or store the plurality of data disclosed.

The system memory 222 may also include a data engine 140 or one or more data engines 140 stored in one or more memory devices comprised in the system memory 222 and which cause one or more computing device processors to execute the various processing stages of FIGS. 8A, 8B, and 8C as further discussed below. For example, the flowchart of FIGS. 8A, 8B, and 8C may be executed using the data engine 140 or a data processing module (e.g., computing module) stored in memory 222 such that the data engine 140 includes instructions that are executed by one or more processing units 221 to implement at least the flowchart of FIGS. 8A, 8B, and 8C.

Exemplary Interfaces

FIGS. 3, 4, 5A, 5B, 6, and 7 show example user interfaces that modify a computing record based on generating and updating a computing report associated with an event.

Figure 3:
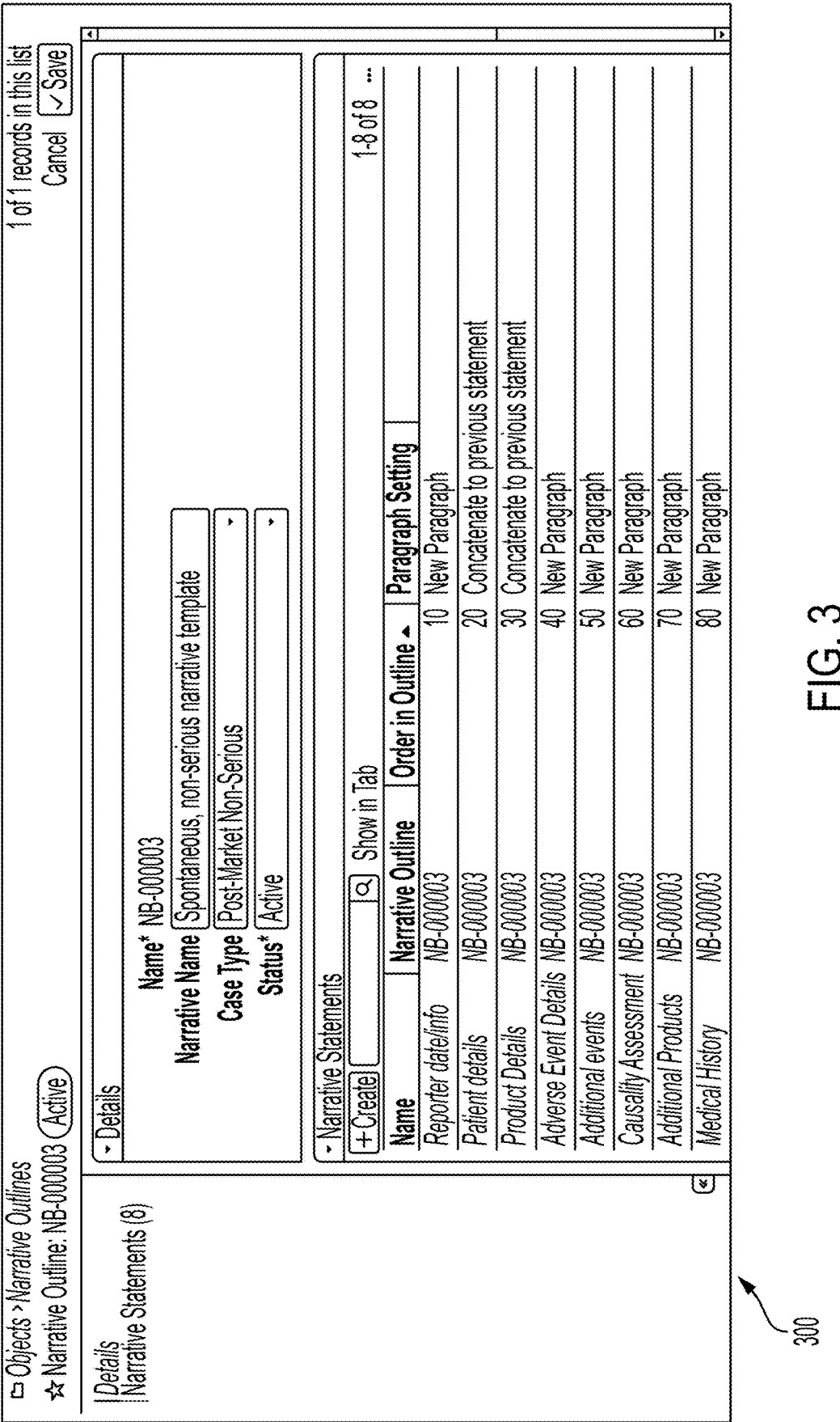

FIG. 3 shows an example configuration user interface 300 within a system that modifies a computing record based on generating and updating a computing report associated with an event. The configuration user interface 300 may comprise at least one of: at least some data associated with a configuration (e.g., an outline) and at least one statement (e.g., rule) associated with the configuration. In one embodiment, the at least some data associated with the configuration may comprise at least one of: a name or identifier associated with the configuration, a name or label associated with a computing report (e.g., "Narrative Name" in FIG. 3), a case type associated with the configuration, or a status associated with the configuration. According to some embodiments, the name or label associated with the computing report may comprise or be associated with at least one classification (e.g., a severity indicator, a computing group, a location, a timing indicator, etc.) associated with the computing report and/or an event.

The case type associated with the configuration, in other embodiments, may comprise or be associated with at least one of: a severity indicator, a computing group, a timing indicator, a location, etc. According to yet other embodiments, the status associated with the configuration may comprise an active status, an inactive status, a pending status, an in-progress status, etc. In some cases, the name or label associated with the computing report may be received via an input (e.g., a typed input, a selection input, etc.) from a user of the system. In other cases, the case type associated with the configuration may be received (e.g., from a set of case types) via an input from a user of the system. In yet other cases, the status associated with the configuration may be received (e.g., from a set of statuses) via an input from a user of the system.

A first statement comprised in the at least one statement associated with the configuration may comprise at least one of: a name associated with the first statement, the configuration in which the first statement is comprised, at least one setting associated with the first statement, at least some data associated with the first statement, and organizational data associated with the first statement. According to some embodiments, the name associated with the first statement may comprise at least some text associated with describing what the first statement does (e.g., a title). In other embodiments, the configuration may comprise the name or identifier associated with the configuration. The at least one setting associated with the first statement, according to yet other embodiments, may comprise a spatial setting, a formatting setting, a paragraph setting, etc. In still other embodiments, the organizational data associated with the first statement may comprise ordering information or instructions (e.g., an ordering of the statements within the configuration). In one embodiment, the first statement may comprise at least one statement option. According to some embodiments, a user of the system may select the first statement in order to view the at least some data associated with the first statement. According to other embodiments, selecting the first statement may direct the user to a statement user interface (e.g., the statement user interface 400 of FIG. 4). In some cases, the at least some data associated with the first statement may comprise the at least one statement option.

In some cases, the name associated with the first statement may be received via an input (e.g., a typed input, a selection input, etc.) from a user of the system. In one embodiment, the configuration may be received (e.g., from a set of configurations) via an input from a user of the system. According to another embodiment, the configuration may be automatically populated based on a state (e.g., a current state, a previous state, a recent state, etc.) of the system. In other cases, the at least one setting associated with the first statement may be received (e.g., from a set of setting options) via an input from a user of the system. In yet other cases, the organizational data associated with the first statement may be received (e.g., from a set of organizational options) via an input from a user of the system. In one embodiment, a user of the system may search the at least one statement associated with the configuration. Furthermore, it is appreciated that searching the at least one statement associated with the configuration may comprise returning search results based on a search string. In some cases, the search string may be associated with at least one of: a name or identifier associated with a statement (e.g., a rule name or identifier), a configuration in which the statement is comprised, a setting associated with the statement, at least some text associated with the statement, etc. According to another embodiment, a user of the system may create a statement to add to the at least one statement associated with the configuration.

Figure 4:
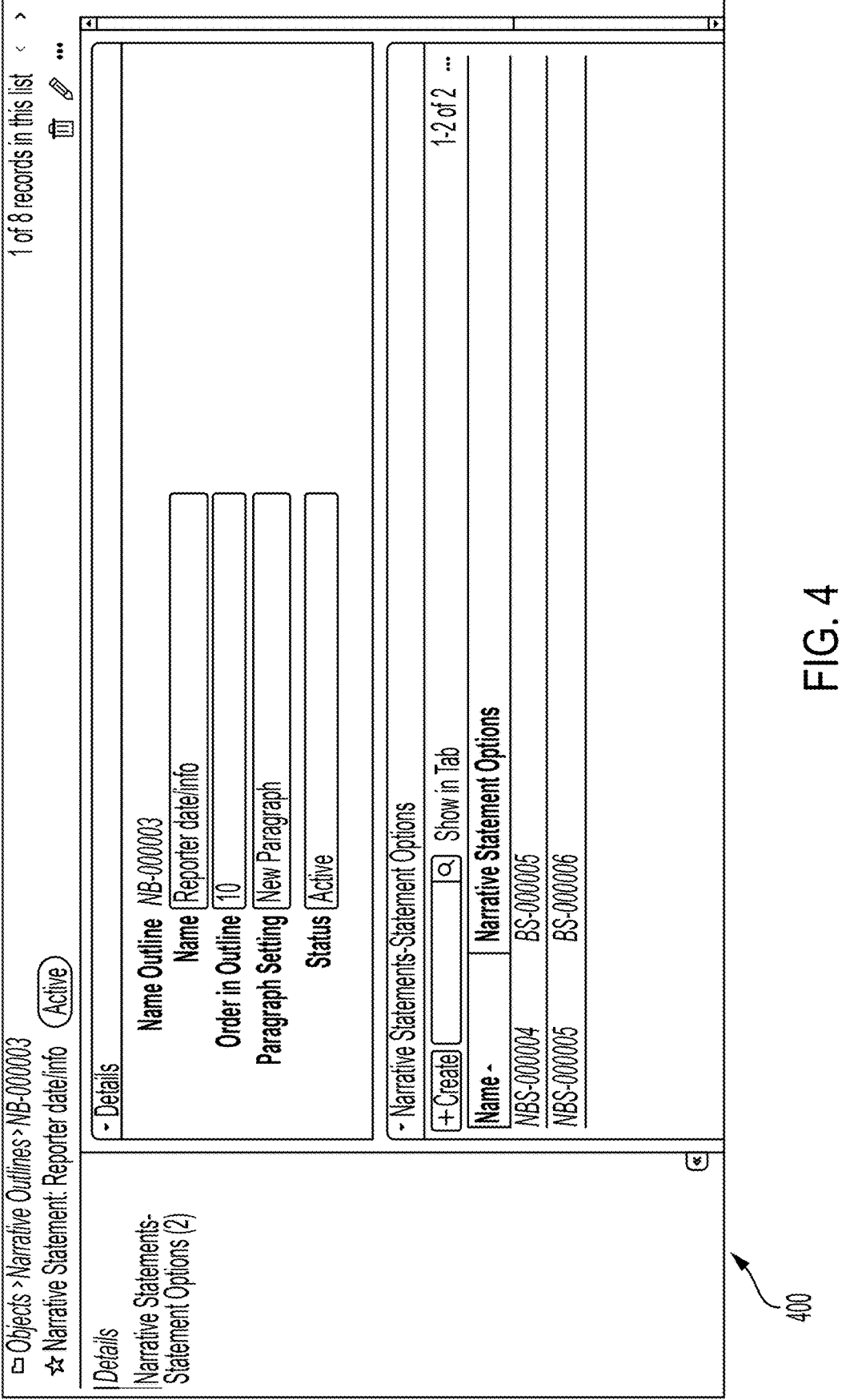

FIG. 4 shows an example statement user interface 400 within a system that modifies a computing record based on generating and updating a computing report associated with an event. The statement user interface 400 may comprise at least one of: at least some data associated with a statement or at least one statement option associated with the statement. The at least some data associated with the statement may comprise at least one of: a name or identifier associated with the statement, a configuration in which the statement is comprised, at least one setting associated with the statement, at least some data associated with the statement, organizational data associated with the statement, and a status associated with the statement and/or the configuration in which the statement is comprised.

A first statement option comprised in the at least one statement option associated with the statement may comprise at least one of: a name or identifier associated with the first statement option, the configuration in which the first statement is comprised, at least one setting associated with the first statement option, and at least some data associated with the first statement option. According to some embodiments, the name or identifier associated with the first statement option may comprise at least some text associated with describing what the first statement does (e.g., a title, a label, an id value, etc.). In other embodiments, the configuration may comprise the name or identifier associated with the configuration. The at least one setting associated with the first statement option, according to yet other embodiments, may comprise a spatial setting, a formatting setting, a paragraph setting, etc. According to some embodiments, a user of the system may select the first statement option in order to view the at least some data associated with the first statement option. In other embodiments, selecting the first statement option may direct the user to a statement option user interface (e.g., the statement option user interface 600 of FIG. 6).

In one embodiment, a user of the system may search the at least one statement option associated with the statement. Furthermore, it is appreciated that searching the at least one statement option associated with the statement may comprise returning search results based on a search string. In some cases, the search string may be associated with at least one of: a name or identifier associated with a statement option, a setting associated with the statement option, at least some text associated with the statement option, etc. According to another embodiment, a user of the system may create a statement option to add to the at least one statement option associated with the statement.

FIGS. 5A and 5B show an example configuration overview user interface 500 within a system that modifies a computing record based on generating and updating a computing report associated with an event. The configuration overview user interface 500 may comprise at least one statement option. In some embodiments, the at least one statement option may be comprised in or associated with at least one statement. According to one embodiment, the at least one statement may be comprised in or associated with at least one configuration. According to another embodiment, the at least one statement may be comprised in or associated with a first configuration. In some cases, a first statement option comprised in the at least one statement option may comprise at least one of: a name associated with the first statement option, a condition associated with the first statement option, a formula associated with the first statement option, a topic associated with the first statement option, a multiple records indicator associated with the first statement option, an ordering indicator associated with the first statement option, or an application programming interface (API) indicator associated with the first statement option.

In one embodiment, a first statement comprised in the at least one statement may comprise at least one of: a name or identifier associated with the first statement, a description associated with the first statement, at least one setting associated with the first statement, and organizational data associated with the first statement. According to some embodiments, the at least one statement and/or the at least one statement option and/or the at least one configuration may be searched and/or filtered based on first data associated with the at least one statement and/or the at least one statement option and/or the at least one configuration. In one embodiment, a user of the system may select the first statement option comprised in the at least one statement option in order to view at least some data associated with the first statement option. In other embodiments, selecting the first statement option comprised in the at least one statement option may direct the user to a statement option user interface (e.g., the statement user interface 600 of FIG. 6).

Figure 6:
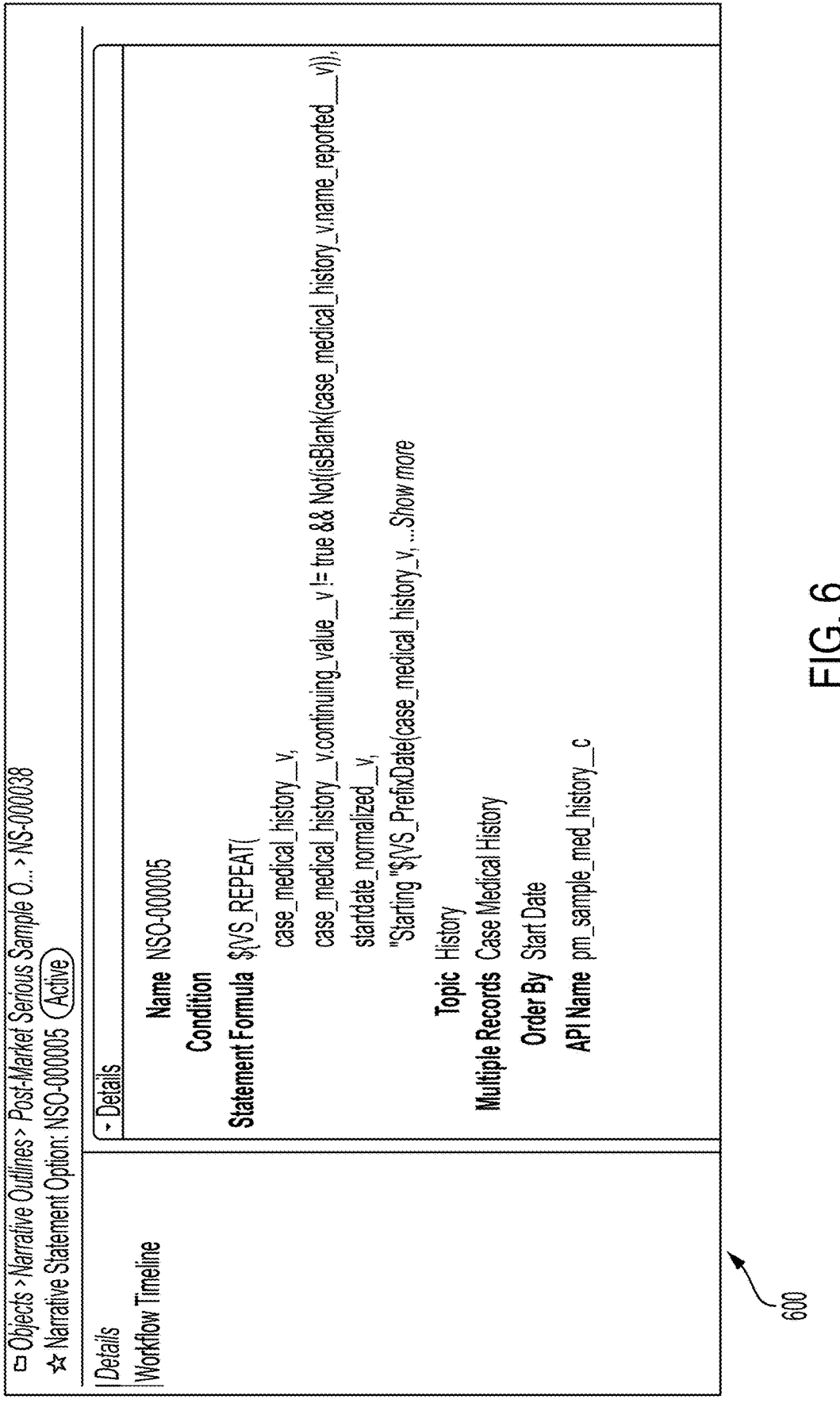

FIG. 6 shows an example statement option user interface 600 within a system that modifies a computing record based on generating and updating a computing report associated with an event. The statement option user interface 600 may comprise at least some data associated with a statement option. In some embodiments, the at least some data associated with the statement option may comprise at least one of: a name associated with the statement option, a condition associated with the statement option, a formula associated with the statement option, a topic associated with the statement option, a multiple records indicator associated with the statement option, an ordering indicator associated with the statement option, or an application programming interface (API) indicator associated with the statement option. According to one embodiment, the name associated with the statement option may comprise a name and/or an identifier associated with the statement option. In another embodiment, the condition associated with the statement option comprises at least one condition that determines when and/or if the statement option is used in and/or is applied to and/or exists within a computing report. In some cases, the condition associated with the statement option may be left blank and/or may be empty.

According to yet another embodiment, the formula associated with the statement option may comprise at least some text associated with what is added to the computing report. In some cases, the at least some text may comprise at least one of: code, an algorithm, a function, a parameter, a variable, etc. Furthermore, in some cases, the formula associated with the statement option may execute and/or run and/or use the at least some text to extract data comprised in a computing record to be added to the computing report. The topic associated with the statement option, in some embodiments, may comprise a subject, a subset, a discipline, a category, a section, etc. associated with the computing report and/or the computing record. It is appreciated that, in one embodiment, the API indicator associated with the statement option may comprise or be associated with a name and/or a function and/or an algorithm associated with the statement option.

According to other embodiments, the multiple records indicator associated with the statement option and the ordering indicator associated with the statement option comprise or are associated with configuring and/or ordering content within the computing report. In yet other embodiments, the multiple records indicator associated with the statement option and the ordering indicator associated with the statement option are relevant when there are multiple computing records associated with the event. According to one embodiment, the multiple records indicator associated with the statement option may comprise a section, a category, a subset, etc. comprised in or associated with the multiple computing records and/or the computing report. In another embodiment, the ordering indicator associated with the statement option comprises a guideline and/or an attribute (e.g., start date, status, end date, resolved date, severity indicator, etc.) by which the content within the computing report should be ordered. According to still other embodiments, the multiple records indicator associated with the statement option and/or the ordering indicator associated with the statement option may be left blank and/or may be empty.

Figure 7:
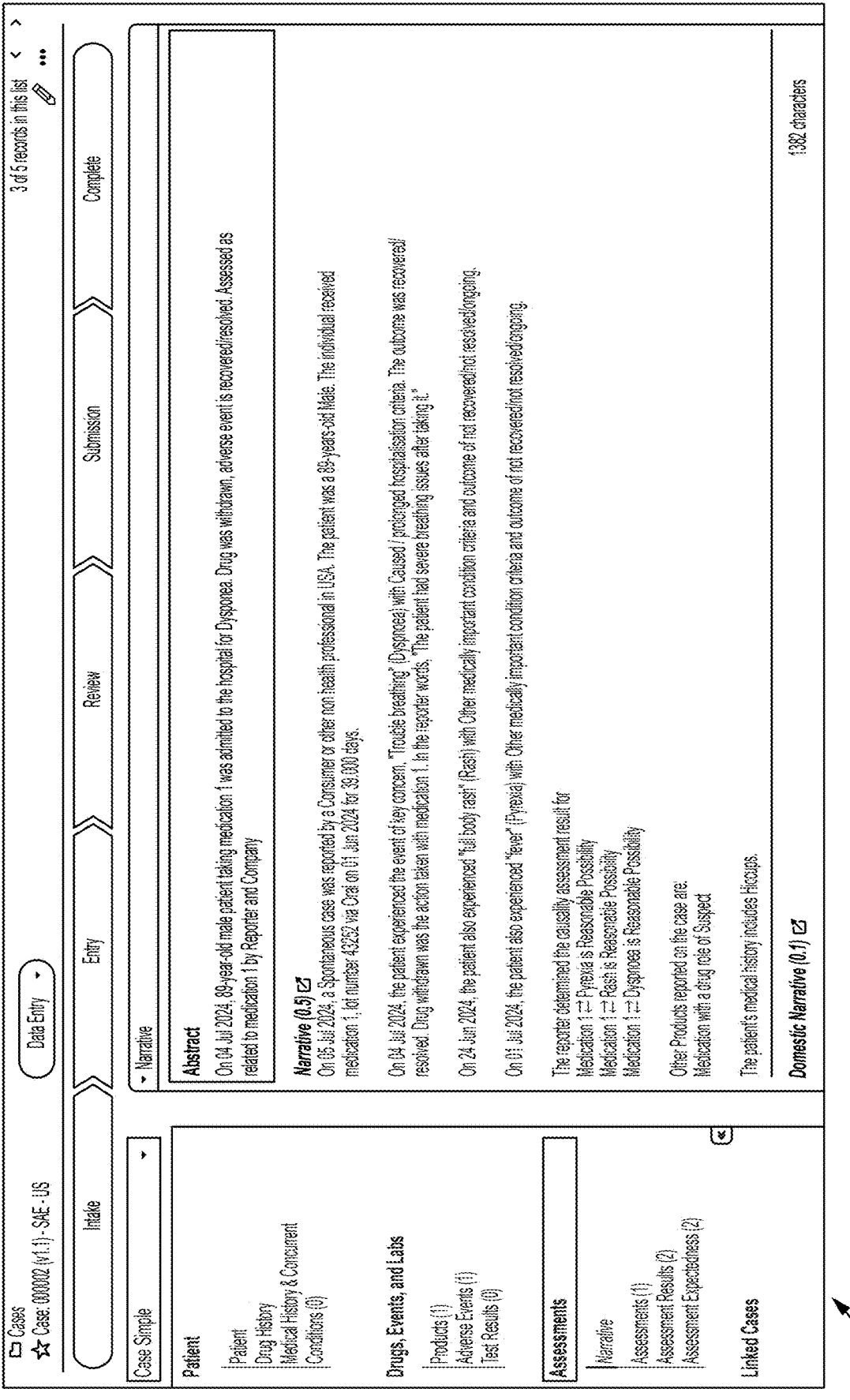

FIG. 7 shows an example computing report user interface 700 within a system that modifies a computing record based on generating and updating a computing report associated with an event. The computing report user interface 700 may comprise a computing report. In some cases, the computing report may be comprised in or linked to a computing record. According to one embodiment, the computing report may comprise an abstract. The abstract, in some embodiments, may comprise an introduction and/or a summary associated with the computing report. In one embodiment, the computing report, comprises at least some text associated with a computing record. According to another embodiment, a user of the system may edit the computing report.

Exemplary Flowcharts

FIGS. 8A, 8B, and 8C show an exemplary workflow for modifying a computing record based on generating and updating a computing report associated with an event. The various blocks of FIGS. 8A, 8B, and 8C may be executed in a different order from that shown in FIGS. 8A, 8B, and 8C. Some blocks may be optional. It is appreciated that one or more data engines stored in one or more memory devices may cause one or more computing device processors to execute the various processing stages of the workflow of FIGS. 8A, 8B, and 8C. For example, the disclosed techniques may be implemented as one or more data engines comprised in a secure storage network that is optimized to store and/or process data associated with a plurality of users or computing models.

At block 802 of FIG. 8A, the one or more data engines may receive, using one or more computing device processors, from a first computing system, a first source file associated with a first event. In one embodiment, the first computing system may comprise an external system. In another embodiment, the first computing system may comprise an internal system. Turning to block 804, the one or more data engines may generate, using the one or more computing device processors, based on the first source file associated with the first event, a first computing record associated with the first event. According to some embodiments, the first computing record associated with the first event comprises at least some data comprised in the first source file. In other embodiments, the first computing record associated with the first event is generated by extracting at least some data comprised in the first source file.

At block 806, the one or more data engines may determine, using the one or more computing device processors, based on first data associated with the first computing record associated with the first event, a severity indicator associated with the first event. In one embodiment, the severity indicator comprises a seriousness or a severity ranking associated with the first event. At block 808, the one or more data engines may be used to determine, using the one or more computing device processors, based on second data associated with the first computing record associated with the first event, a location associated with the first event. According to another embodiment, the location associated with the first event may comprise or be associated with at least one of: a country, a state, a region, a continent, a city, a county, a province, etc. At block 810, the one or more data engines may determine, using the one or more computing device processors, based on third data associated with the first computing record associated with the first event, a computing group associated with the first event. In yet another embodiment, the computing group associated with the first event may comprise an organization, a customer, a company, etc.

At block 812, the one or more data engines may generate, using the one or more computing device processors, based on the severity indicator, the location, and the computing group, a first configuration, wherein the first configuration is executable to generate a computing report. In some embodiments, the first configuration may comprise an outline or a template. In other embodiments, the first configuration defines or comprises a structure (e.g., a semantic structure) associated with a computing report. According to yet other embodiments, the first configuration may require an update if there is a change in at least one of: the severity indicator, the location, or the computing group. The one or more data engines may, at block 814, execute, using the one or more computing device processors, based on the first computing record, the first configuration, thereby generating a first computing report associated with the first event. In one embodiment, the first configuration may be applied to or executed on the first computing record. According to another embodiment, the first computing report may comprise a narrative associated with the first computing record, and/or a summary associated with the first computing record, and/or at least some data comprised in the first computing record. In some embodiments, generating the first computing report may comprise applying at least one rule to or executing at least one rule on at least some data comprised in the first computing record. Furthermore, according to one embodiment, applying the at least one rule to the at least some data comprised in the first computing record may comprise extracting first information comprised in the at least some data, formatting the first information comprised in the at least some data, thereby generating formatted first information, and adding the formatted first information to the first computing report. Formatting the first information, in one embodiment, may comprise at least one of: paragraph formatting, spacing formatting, capitalization formatting, number formatting, decimal formatting, date formatting, etc.

Turning to FIG. 8B, at block 816, the one or more data engines may first modify, using the one or more computing device processors, based on the first computing report, the first computing record associated with the first event. In some cases, first modifying the first computing record may comprise adding or linking the first computing report to the first computing record. At block 818, the one or more data engines may receive, using the one or more computing device processors, from the first computing system or a second computing system, a second source file. In one embodiment, the second computing system may comprise an external system. In another embodiment, the second computing system may comprise an internal system.

At block 820, the one or more data engines may determine, using the one or more computing device processors, the second source file is associated with the first event. At block 822, the one or more data engines may generate, using the one or more computing device processors, based on the second source file, a second computing record. According to some embodiments, the second computing record comprises at least some data comprised in the second source file. In other embodiments, the second computing record is generated by extracting at least some data comprised in the second source file. The one or more data engines may, at block 824, compare, using the one or more computing device processors, the first computing record and the second computing record. In some embodiments, determining the second source file is associated with the first event comprises or is comprised in comparing the first computing record and the second computing record. According to one embodiment, comparing the first computing record and the second computing record may comprise a manual comparison (e.g., a user opens both records and compares data). In another embodiment, comparing the first computing record and the second computing record may comprise a comparison performed automatically (e.g., at least partially automatically) by a computing system. According to yet another embodiment, comparing the first computing record and the second computing record may comprise a comparison of at least some identifying data associated with the first event.

At block 826, the one or more data engines may determine, using the one or more computing device processors, based on the comparing the first computing record and the second computing record, a first discrepancy. In some cases, the first discrepancy is associated with at least one of: the severity indicator, the location, or the computing group. In other cases, the first discrepancy is associated with at least some data comprised in the second computing record, but not comprised in the first computing record. According to some embodiments, the first discrepancy is associated with updated information or new information associated with the first event. At block 828, the one or more data engines may second modify, using the one or more computing device processors, based on the first discrepancy, the first computing record associated with the first event. In one embodiment, second modifying the first computing record associated with the first event comprises adding or updating information associated with the first event.

At block 830, the one or more data engines may determine, using the one or more computing device processors, based on the first discrepancy, whether the first configuration requires an update. According to some embodiments, determining the first configuration requires the update is based on or comprises determining whether the first discrepancy is associated with at least one of: the severity indicator, the location, or the computing group. For example, if there is a change in the at least one of: the severity indicator, the location, or the computing group, in one embodiment, the first configuration requires an update. Turning to FIG. 8C, at block 832, the one or more data engines may, upon determining the first configuration requires the update, update, using the one or more computing device processors, the first configuration, thereby generating an updated first configuration. In some embodiments, the updated first configuration may comprise an outline or a template.

At block 834, the one or more data engines may execute, using the one or more computing device processors, based on the first computing record, the first configuration or the updated first configuration, thereby generating an updated first computing report associated with the first event. In one embodiment, the first configuration or the updated first configuration or a second configuration may be applied to or executed on the first computing record. According to another embodiment, the updated first computing report may comprise a narrative associated with the first computing record, and/or a summary associated with the first computing record, and/or at least some data comprised in the first computing record. In some embodiments, generating the updated first computing report may comprise applying at least one rule to or executing at least one rule on at least some data comprised in the updated first computing record. Furthermore, according to one embodiment, applying the at least one rule to the at least some data comprised in the updated first computing record may comprise extracting second information comprised in the at least some data, formatting the second information comprised in the at least some data, thereby generating formatted second information, and adding the formatted second information to the first computing report. Formatting the second information, in one embodiment, may comprise at least one of: paragraph formatting, spacing formatting, capitalization formatting, number formatting, decimal formatting, date formatting, etc. At block 836, the one or more data engines may third modify, using the one or more computing device processors, based on the updated first computing report, the first computing record associated with the first event. In some cases, third modifying the first computing record may comprise adding or linking the updated first computing report to the first computing record.

In another embodiment, a system and a computer program product can include or execute the method described above. These and other implementations may each optionally include one or more of the following features.

There is a need for an individual case safety report (ICSR) management system that automatically generates a narrative based on a given case file. It is appreciated that the method described above may be implemented in an ICSR management system. In one embodiment, the first event comprises or is associated with an adverse event. The adverse event, in some cases, may be associated with at least one of: a medication, a patient, a clinical trial, a medical treatment, etc. According to another embodiment, the first source file and/or the first computing system is associated with at least one of: a pharmaceutical company, the computing group, a healthcare professional, a medical device manufacturer, a drug manufacturer, a clinical trial sponsor, etc. In yet another embodiment, the second source file and/or the second computing system is associated with at least one of: a pharmaceutical company, the computing group, a healthcare professional, a medical device manufacturer, a drug manufacturer, a clinical trial sponsor, etc. In some embodiments, the severity indicator may comprise a seriousness and/or a severity ranking associated with the adverse event (e.g., serious, non-serious, post-market serious, post-market non-serious, etc.). According to other embodiments, the computing group may comprise at least one of: a research organization, a pharmaceutical company, a medical device or drug manufacturer, etc. It is appreciated that, in some embodiments, a computing report may comprise a narrative associated with the adverse event. In some cases, the computing report may be generated at any stage of the adverse event (e.g., intake, entry, review, submission, etc.). According to one embodiment, comparing computing records may comprise a comparison of at least one of: a medication, a patient, a clinical trial, a medical treatment, a date, etc. associated with the computing records.

The above-described features and applications can be implemented as software processes or data engines include specified sets of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "application" or "software" is meant to include firmware residing in read-only memory or applications stored in magnetic storage, which can be read into memory for processing by a processor. Also, in some implementations, multiple software or application technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, application, script, or code) can be written in any form of programming language, including compiled or interpreted languages, declarative or procedural languages, and it can be deployed in any form, including as a standalone program or as a sub-system, component, sub-routine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more sub-systems, sub programs, or portions of code). A computer program can be deployed to be executed on one computer or on multiple computers that are located at one site or distributed across multiple sites and interconnected by a communication network.

As used in this specification and any claims of this application, the terms "computer," "server," "processor," and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

Various terms used herein have meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

It is appreciated that the term optimize/optimal and its variants (e.g., efficient or optimally) may simply indicate improving, rather than the ultimate form of 'perfection' or the like.

It is further appreciated that any portion or element of any embodiment (structure, method, etc.) disclosed herein may be combined with any portion or element of any other embodiment (structure, method, etc.) disclosed herein.

Additionally, the section headings herein are provided for consistency with the suggestions under 37 CFR 1.77 or otherwise to provide organizational cues. These headings shall not limit or characterize the disclosed embodiment(s) set out in any claims that may issue from this disclosure. Specifically, and by way of example, although the headings refer to a "Technical Field," such claims should not be limited by the language chosen under this heading to describe the so-called technical field. Further, a description of a technology in the "Background" is not to be construed as an admission that technology is prior art to any disclosed embodiment(s) in this disclosure. Neither is the "Summary" to be considered as a characterization of the disclosed embodiment(s) set forth in issued claims. Furthermore, any reference in this disclosure to "embodiment" in the singular should not be used to argue that there is only a single point of novelty in this disclosure. Multiple embodiments may be set forth according to the limitations of the multiple claims issuing from this disclosure, and such claims accordingly define the disclosed embodiment(s), and their equivalents, which are protected thereby. In all instances, the scope of such claims shall be considered on their own merits in light of this disclosure, but should not be constrained by the headings set forth herein.

19

The invention claimed is:

1. A method for modifying a computing record based on generating and updating a computing report associated with an event, the method comprising:

receiving, using one or more computing device processors, from a first computing system, a first source file associated with a first event;

generating, using the one or more computing device processors, based on the first source file associated with the first event, a first computing record associated with the first event;

determining, using the one or more computing device processors;

based on first data associated with the first computing record associated with the first event, a severity indicator associated with the first event, based on second data associated with the first computing record associated with the first event, a location associated with the first event, or based on third data associated with the first computing record associated with the first event, a computing group associated with the first event;

generating, using the one or more computing device processors, based on at least one of the severity indicator, the location, or the computing group, a first configuration, wherein the first configuration is executable to generate a computing report;

executing, using the one or more computing device processors, based on the first computing record, the first configuration, thereby generating a first computing report associated with the first event;

modifying, using the one or more computing device processors, at a first time, based on the first computing report, the first computing record associated with the first event;

receiving, using the one or more computing device processors, from the first computing system or a second computing system, a second source file;

determining, using the one or more computing device processors, the second source file is associated with the first event;

generating, using the one or more computing device processors, based on the second source file, a second computing record;

comparing, using the one or more computing device processors, the first computing record and the second computing record;

determining, using the one or more computing device processors, based on the comparing the first computing record and the second computing record, a first discrepancy;

modifying, using the one or more computing device processors, at a second time, based on the first discrepancy, the first computing record associated with the first event;

determining, using the one or more computing device processors, based on the first discrepancy, whether the first configuration requires an update;

after determining the first configuration requires the update, updating, using the one or more computing device processors, the first configuration, thereby generating an updated first configuration;

executing, using the one or more computing device processors, based on the first computing record, the first configuration or the updated first configuration, thereby generating an updated first computing report associated with the first event; and

modifying, using the one or more computing device processors, at a third time, based on the updated first computing report, the first computing record associated with the first event.

2. The method of claim 1, wherein the generating the first computing report associated with the first event comprises applying at least one rule to fourth data comprised in the first computing record.

3. The method of claim 2, wherein the applying the at least one rule to the fourth data comprised in the first computing record comprises:

extracting first information comprised in the fourth data;

formatting the first information comprised in the fourth data, thereby generating formatted first information; and adding the formatted first information to the first computing report.

4. The method of claim 1, wherein the determining whether the first configuration requires the update is based on the first discrepancy being associated with at least one of: the severity indicator, the location, or the computing group.

5. The method of claim 1, wherein the generating the first configuration is based on the severity indicator, the location, and the computing group.

6. The method of claim 1, wherein the location associated with the first event comprises or is associated with at least one of: a country, a city, a state, or a region.

7. The method of claim 1, wherein the severity indicator associated with the first event comprises or is based on a severity ranking or a seriousness associated with the first event.

8. The method of claim 1, wherein the computing group associated with the first event comprises or is associated with at least one of: an organization, a customer, or a company.

9. The method of claim 1, wherein the first computing report comprises a narrative or a summary associated with the first event.

10. The method of claim 1, wherein the one or more computing device processors are comprised in one or more computing systems, wherein the one or more computing systems are located in one or more locations.

11. A system for modifying a computing record based on generating and updating a computing report associated with an event, the system comprising:

one or more hardware computing system processors; and at least one memory storing instructions, that when executed by the one or more hardware computing system processors causes the system to perform operations comprising:

receive, from a first computing system, a first source file associated with a first event;

generate, based on the first source file associated with the first event, a first computing record associated with the first event;

determine, based on first data associated with the first computing record associated with the first event, a severity indicator associated with the first event;

determine, based on second data associated with the first computing record associated with the first event, a location associated with the first event;

determine, based on third data associated with the first computing record associated with the first event, a computing group associated with the first event;

generate, based on the severity indicator, the location, and the computing group, a first configuration, wherein the first configuration is executable to generate a computing report;

execute the first configuration on the first computing record, thereby generating a first computing report associated with the first event;

first modify, based on the first computing report, the first computing record associated with the first event;

receive, from the first computing system or a second computing system, a second source file;

determine the second source file is associated with the first event; generate, based on the second source file, a second computing record;

compare the first computing record and the second computing record;

determine, based on the comparison of the first computing record and the second computing record, a first discrepancy;

second modify, based on the first discrepancy, the first computing record associated with the first event;

determine, based on the first discrepancy, whether the first configuration requires an update;

after determining the first configuration requires the update, update the first configuration, thereby generating an updated first configuration;

execute the first configuration or the updated first configuration on the first computing record, thereby generating an updated first computing report associated with the first event; and third modify, based on the updated first computing report, the first computing record associated with the first event.

12. The system of claim 11, wherein the first discrepancy comprises updated information associated with the first event or new information associated with the first event.

13. The system of claim 12, wherein the second modifying, based on the first discrepancy, the first computing record comprises:

updating the first computing record based on the updated information associated with the first event, or adding the new information associated with the first event.

14. The system of claim 11, wherein the determining the second source file is associated with the first event comprises or is based on the comparing the first computing record and the second computing record.

15. The system of claim 11, wherein the updated first computing report comprises the first computing report.

16. A method for modifying a computing record based on generating and updating a computing report associated with an event, the method comprising:

receiving, using one or more computing device processors, from a first computing system, a first source file associated with a first event;

generating, using the one or more computing device processors, based on the first source file associated with the first event, a first computing record associated with the first event;

determining, using the one or more computing device processors, based on first data associated with the first computing record associated with the first event, a severity indicator associated with the first event;

determining, using the one or more computing device processors, based on second data associated with the first computing record associated with the first event, a location associated with the first event;

determining, using the one or more computing device processors, based on third data associated with the first computing record associated with the first event, a computing group associated with the first event;

generating, using the one or more computing device processors, based on at least one of: the severity indicator, the location, and the computing group, a first configuration, wherein the first configuration is executable to generate a computing report;

executing, using the one or more computing device processors, based on the first computing record, the first configuration, thereby generating a first computing report associated with the first event;

first modifying, using the one or more computing device processors, based on the first computing report, the first computing record associated with the first event;

receiving, using the one or more computing device processors, from the first computing system or a second computing system, a second source file;

determining, using the one or more computing device processors, the second source file is associated with the first event;

generating, using the one or more computing device processors, based on the second source file, a second computing record;

comparing, using the one or more computing device processors, the first computing record and the second computing record;

determining, using the one or more computing device processors, based on the comparing the first computing record and the second computing record, a first discrepancy;

second modifying, using the one or more computing device processors, based on the first discrepancy, the first computing record associated with the first event;

executing, using the one or more computing device processors, based on the first computing record, the first configuration or a second configuration, thereby generating an updated first computing report associated with the first event; and third modifying, using the one or more computing device processors, based on the updated first computing report, the first computing record associated with the first event.

17. The method of claim 16, wherein the first modifying, based on the first computing report, the first computing record, comprises adding or linking the first computing report to the first computing record.

18. The method of claim 16, wherein the third modifying, based on the updated first computing report, the first computing record comprises adding or linking the updated first computing report to the first computing record.

19. The method of claim 16, wherein the updated first computing report comprises a narrative or a summary associated with the first event.

20. The method of claim 16, wherein the one or more computing device processors are comprised in one or more computing systems, wherein the one or more computing systems are located in one or more locations.

21. The method of claim 1, wherein the first configuration defines a structure associated with the first computing report.

22. The method of claim 2, wherein the applying the at least one rule to the fourth data comprised in the first computing record comprises providing or applying a structure to the first computing record.

* * * * *